(No Model.)

A. B. KOKERNOT.
REFRIGERATING ATTACHMENT FOR BEER BARRELS.

No. 433,867. Patented Aug. 5, 1890.

WITNESSES:
R. W. Dean
Robert Ries.

INVENTOR
Alexander Benjamin Kokernot
BY
Walter H. Cox
ATTORNEY.

UNITED STATES PATENT OFFICE.

ALEXANDER BENJAMIN KOKERNOT, OF NEW ORLEANS, LOUISIANA.

REFRIGERATING ATTACHMENT FOR BEER-BARRELS.

SPECIFICATION forming part of Letters Patent No. 433,867, dated August 5, 1890.

Application filed February 5, 1890. Serial No. 339,260. (No model.)

*To all whom it may concern:*

Be it known that I, ALEXANDER B. KOKERNOT, a citizen of the United States, residing at New Orleans, in the parish of Orleans and State of Louisiana, have invented certain new and useful Improvements in Refrigerating Attachments for Beer-Barrels; and I do hereby declare that the following is a full, clear, and exact description of the same, reference being had to the annexed drawings, making a part of this specification, and to the figures of reference marked thereon.

The object of my invention is to provide a refrigerating attachment for beer-barrels and other vessels for containing liquids or various food products, so constructed that said attachment can be readily supplied with a refrigerating medium in either a solid, liquid, or aeriform state; and the invention consists in the construction and combination of parts, as hereinafter described and claimed.

Figure 1:
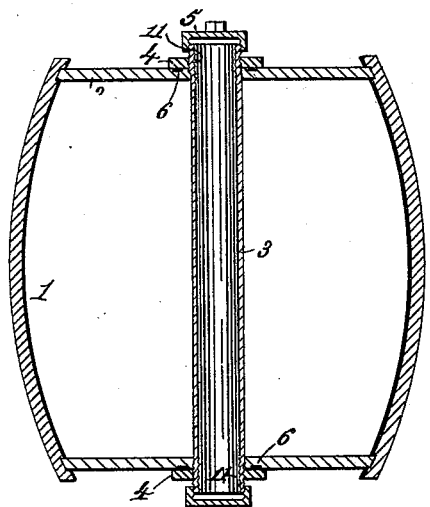
Figure 2:
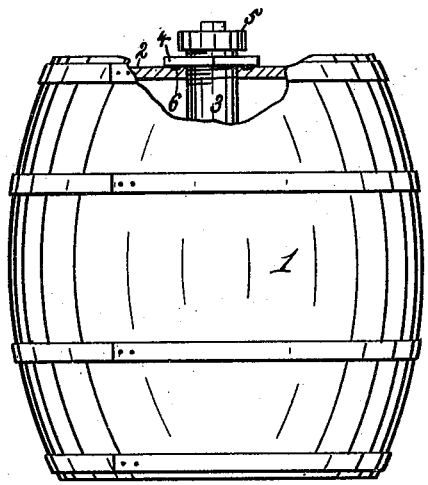
Figure 3:
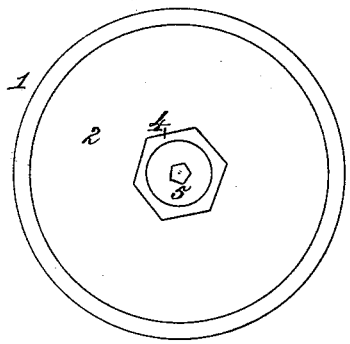
Figure 4:
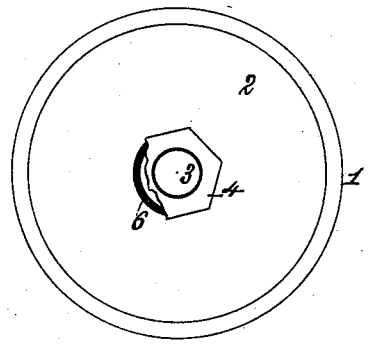
Figure 5:
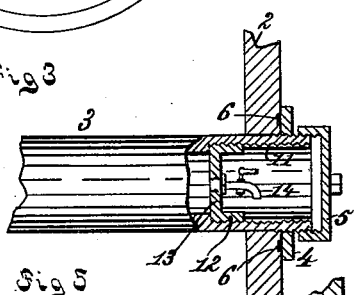
Figures 6, 7:
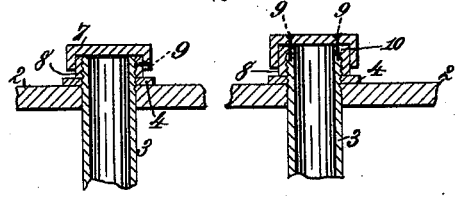
Figure 8:
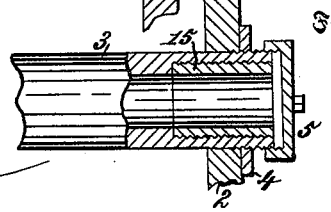

In the annexed drawings, Figure 1 is a sectional elevation of a barrel provided with my improved refrigerating attachment. Fig. 2 is an elevation of the same, partly broken away. Fig. 3 is a top view. Fig. 4 is a top view with the cap removed and a portion of the nut broken away. Fig. 5 is a partly sectional view of one end of the refrigerating-tube with a stop-cock supported therein. Figs. 6 and 7 are sectional detail views illustrating a construction in which the outer ends of the refrigerating-tube are surrounded by nuts placed outside of and in contact with the heads of the receptacle, and showing sleeves placed on the end of the tube beyond the nuts to form seats for the caps, by which the ends of the tube are closed. Fig. 8 is a sectional detail view showing a bushing inserted in the end of the refrigerating-tube after the removal of the stop-cock.

Referring to the drawings, the numeral 1 designates a barrel having heads 2, either or both provided with a central perforation, through which an open-ended refrigerating-tube 3 is inserted. The ends of the refrigerating-tube 3 are exteriorly threaded and project outside the heads 2 a sufficient distance to afford attachment for the nuts 4, by which said tube is securely fastened in place, and for the engagement of screw-caps 5, by which the ends of said tube are closed. By this construction the refrigerating-tube is held in position as firmly and securely as though it were an integral part of the vessel or packing-receptacle, while at the same time the tube is readily detachable at will by simply removing the nut and cap from one end. A packing-ring 6 is permanently attached by any suitable means to each head of the barrel or vessel around the opening through which the refrigerator-tube is passed and beneath the nut 5 that holds said tube in place, so that while the nuts rest on these rings and are securely packed thereby the heads of the barrel or vessel will at the same time be materially strengthened. The permanent attachment of the packing-rings 6 will also be of great convenience for dispatch in attaching the refrigerating apparatus to the vessel.

When it is desired to provide the tube 3 with smooth air-tight caps or covers—such as shown at 7 in Figs. 6 and 7—sleeves 8, having a smooth exterior and a threaded interior, are screwed over the projecting ends of the tube, and in order that the caps or covers may be locked or secured in position one or more set-screws 9 are countersunk through the flanged rim of the cap or cover, as shown in Fig. 6, and through the sleeve, so as to abut against the tube. If desired, the sleeve 8 may be provided at its upper end with an inward-projecting flange 10 to lap the end of the tube 3, as shown in Fig. 7, said flange being of a width equal to the thickness of the tube, as shown. In this construction the set-screws 9 are passed through the top of the cap or cover and through the flange 10 into the end of the tube.

In order to provide a convenient means for introducing an aeriform fluid into the refrigerator-tube 3, and so that the device through which the said tube is charged may, when desired, remain attached to the tube, one end of the tube 3 is recessed or countersunk all around on its inner surface and screw-threaded throughout said annular recess 11 to receive an externally-threaded bushing 12, Fig. 5, having at its inner end a head 13, provided with a central screw-threaded opening in which is screwed a stop-cock 14, to which access is afforded through the open outer end of the bushing 12 when the cap or cover is removed from the end of the refrigerator-tube.

By means of the stop-cock 14 the refrigerator-tube 3 can be conveniently charged with an aeriform fluid through any suitable tubing attached to the open cock, after which the cock is closed and the cap or cover replaced on the end of the refrigerator-tube. By this means the barrel or vessel with the refrigerator-tube 3 charged can be transported or moved about as desired without interfering with or disturbing the stop-cock; nor can the charge of the tube 3 by any possibility escape, for even should the stop-cock be defective and leaky the cap or cover on the tube 3 will arrest the farther progress of the fluid.

Another advantage of the stop-cock 14, arranged as shown, resides in the fact that the barrel can be supported on its end and the surplus water discharged by the stop-cock without disturbing the position of the barrel, while a supply of ice can be introduced at the upper end of the refrigerator-tube by removing the cap 5 at such end.

When it is desired to adapt the refrigerator-tube 3 for the reception of ice or a cooling or refrigerating material other than an aeriform fluid, the stop-cock 14 and bushing 12 are removed and a bushing 15 of sufficient length to fill the recess 11 is inserted therein, thereby protecting the threads of said recess from injury. The bushing 15 is open at both ends, and is externally threaded to readily engage the threads of the recess 11, and it has a smooth inner surface which corresponds with the interior of the refrigerator-tube 3 and makes it smooth and even throughout for the reception of ice or other refrigerating material.

The bushings 12 and 15 may each be provided at their outer ends with notches or suitable mortises for the engagement of a wrench, by which they can be screwed into position.

What I claim as my invention is—

1. The combination, with a barrel or similar receptacle having heads provided with openings, and a refrigerating-tube inserted in said receptacle through said openings and having open externally-threaded ends projecting outside the receptacle, of nuts engaging the projecting ends of the tube in contact with the outside of the receptacle, sleeves engaging the tube outside of said nuts and resting thereon, and caps or covers engaged with the outer ends of the tube and sleeves, substantially as described.

2. The combination, with a barrel or similar receptacle having a suitable opening therein, and a refrigerating-tube inserted in said receptacle through said opening and having an open end projecting outside the receptacle, of a bushing inserted within said end of the refrigerating-tube and having a closed inner end and an open outer end, a stop-cock supported in the inner end of said bushing and surrounded by the refrigerating-tube, and a cap or cover closing the outer end of said tube, substantially as described.

In testimony whereof I have hereunto subscribed my name in the presence of two witnesses.

ALEXANDER BENJAMIN KOKERNOT.

Witnesses:
WALTER H. COOK,
ROBERT RIES.